Nov. 7, 1933.　　　P. B. FLANDERS ET AL　　　1,934,416
VIBRATION TRANSLATING DEVICE
Filed Oct. 20, 1930　　2 Sheets-Sheet 1
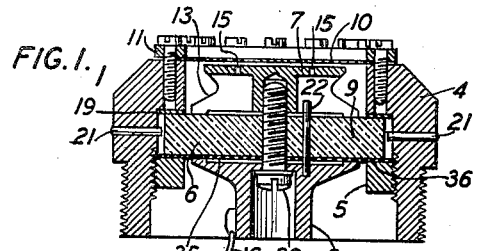
FIG.1.
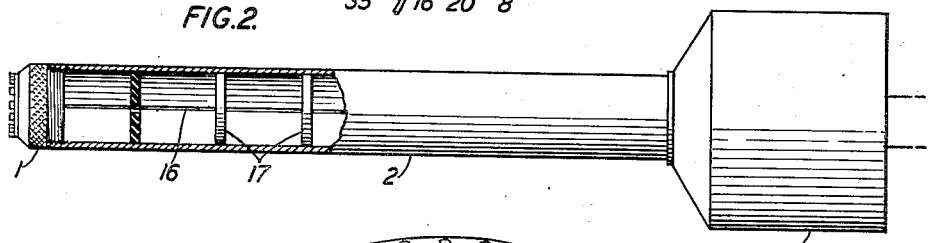
FIG.2.
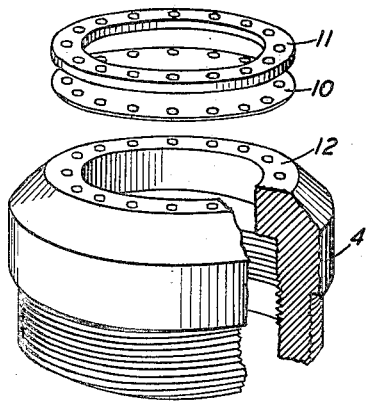
FIG.3.
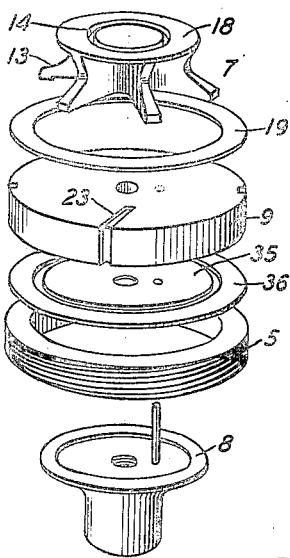
INVENTORS
P. B. FLANDERS
H. C. HARRISON
BY
ATTORNEY

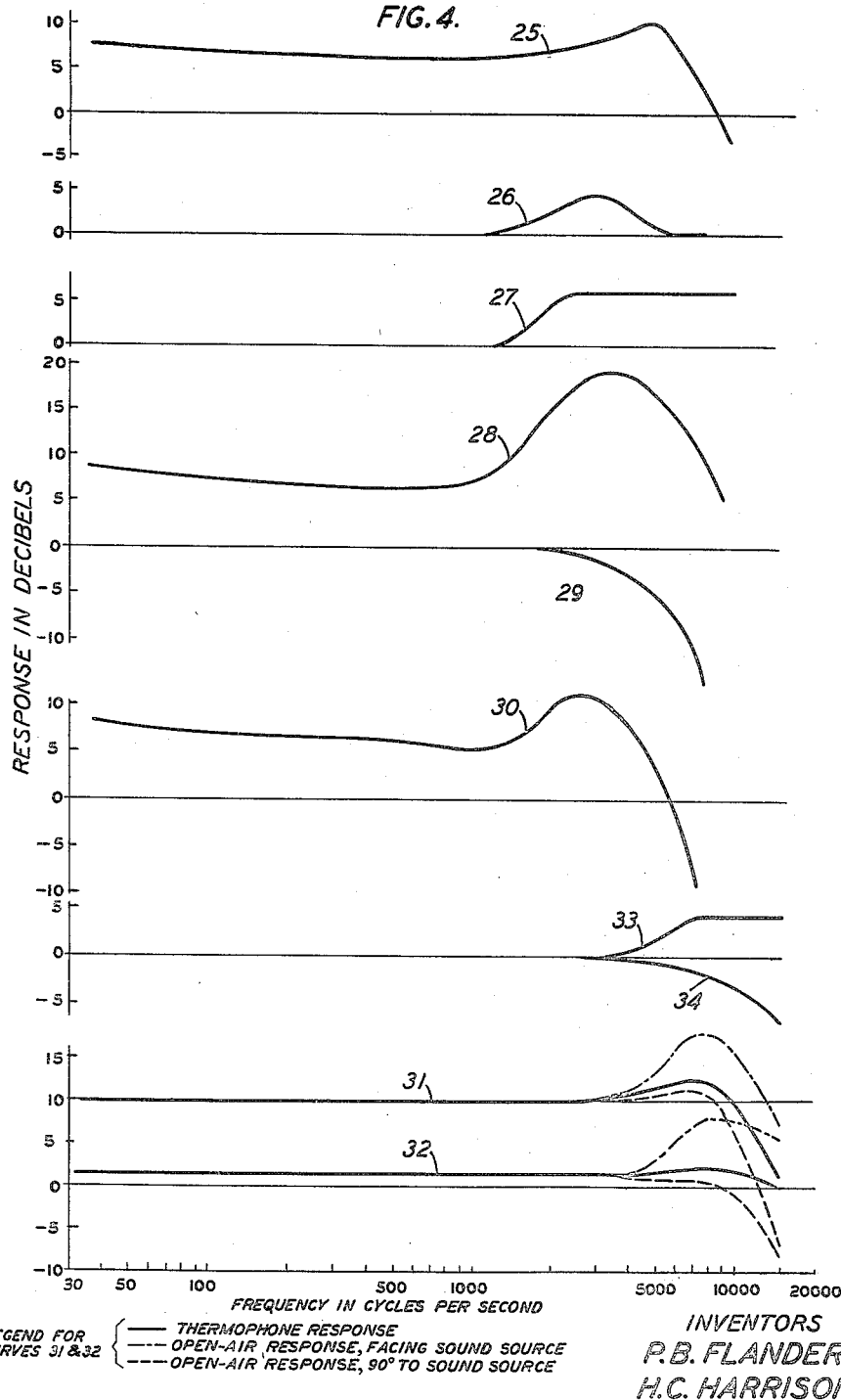

Patented Nov. 7, 1933

1,934,416

UNITED STATES PATENT OFFICE 1,934,416

VIBRATION TRANSLATING DEVICE

Paul B. Flanders, East Orange, N. J., and Henry C. Harrison, Port Washington, N. Y., assignors to Bell Telephone Laboratories, Incorporated, New York, N. Y., a corporation of New York Application October 20, 1930. Serial No. 489,846

6 Claims. (Cl. 179—111)

This invention relates to vibration translating devices of the electrostatic type and more particularly to transmitters comprising a stationary back electrode and a diaphragm of stretched material disposed in close face-to-face relation, the diaphragm being adapted to be vibrated to vary the capacity of the device.

While the invention is not necessarily limited in its application to transmitters, since a similar structure may also be used in other translating devices, it is particularly applicable to transmitters for sound pick-up purposes in high quality systems and will, therefore, be described with reference to this application for purposes of illustration.

It is the general object of the invention to simplify the construction and improve the operation of these devices.

The improvement attained, according to the invention, consists in providing at relatively low cost, a device which is capable of responding at uniformly high efficiency to a much greater range of frequencies than the instruments available heretofore. It is comparatively easy to design a device of this kind which has any one of these desirable characteristics but when it is sought to combine them in a single structure, a number of difficulties are encountered which will be better understood from a brief review of the prior art.

In Patent 1,333,744 to E. C. Wente, March 16, 1920 there is disclosed a transmitter in which the sound responsive element is a thin metal diaphragm closely spaced with respect to a plate member which forms the other electrode of the condenser. A heavy clamping ring surrounds this electrode and serves to tension the diaphragm and thereby raise its natural frequency to a point near or above the upper limit of the working range. Since a very high tension is required, the clamping ring must be rather large and it therefore materially increases the size of the device. The thermophone calibration, which is commonly used for the purpose of indicating its response, shows that an instrument of this kind operates at practically a constant efficiency over a very wide range of frequencies but more recent investigations have disclosed that there are additional factors which considerably modify the response of the device in actual use. The more important of these factors are the increase in response in certain parts of the range due to the air resonating in the cavity formed by the clamping ring and the increase due to the disturbance in the sound field caused by placing the instrument in it.

This latter effect is discussed at some length by Stuart Ballantine in an article "Effect of Diffraction Around the Microphone in Sound Measurements" in the Physical Review, vol. XXXII, December 1928. Briefly stated, if the instrument is small as compared with the wave length of the sound it is a case of ordinary Laplacian flow of air past an irregular object and the pressure on the diaphragm is practically that in the undisturbed sound field while if the diaphragm is of infinite extent the pressure on it will be double that of the undisturbed sound field for all frequencies due to the reflection effect. The condenser transmitters commonly used heretofore have been of the order of 3 inches in diameter which is approximately equal to the quarter wave length of a 1,100 cycle wave and it is found in accordance with the above theory that the incident pressure on the diaphragm of such a transmitter varies from normal for frequencies below 1,100 cycles to substantially twice normal around 2,500 cycles, which results in giving 6 db. gain in response for all frequencies above this latter value.

A third factor which causes the actual response to differ from that indicated by the thermophone calibration may be termed the "phase loss" which is due to the variation in pressure across the diaphragm occurring when waves of length less than or comparable to the diameter of the diaphragm approach the transmitter from directions other than directly in front of the instrument. For instance, when the transmitter is facing the sound source in a live room there will be considerable phase loss due to the waves deflected from the walls of the room.

In accordance with the general features of this invention the range of uniform frequency response of these devices is materially extended by substantially eliminating the cavity in which resonance occurs and making the instrument very small so as to minimize the phase loss and cause the pressure doubling effect to occur much higher in the frequency scale where it will be less objectionable.

Heretofore, these results have not been attainable because of certain practical difficulties. In order to stretch the diaphragm and maintain it at the required tension the stretching and clamping frame must be made rather bulky, thereby causing both the cavity and the pressure doubling effects to occur in the important speech range. Other considerations, such as loss of efficiency due to unavoidable dead capacity and other factors, limit the possible reduction in the diameter of the diaphragm itself, and hence the improvement in response which can be gained by merely making the present structures smaller is also rather limited. If the necessity for the frame is eliminated by using an unstretched diaphragm, it is impossible to keep the response reasonably constant over a wide range of frequencies without making the device very inefficient. Since the output of any condenser transmitter is very small, even small losses in efficiency are objectionable.

In order, therefore, to make a satisfactory device of this kind, which is very small, it is essential that its efficiency be kept up. This can be done only by keeping the diaphragm very thin and light and designing the electrodes of the device to give maximum generated voltage. In fact, the requirements for the diaphragm are such that stretching is necessary for otherwise, with a diaphragm of the proper physical properties, the close and accurate spacing of the electrodes cannot be maintained in service. The tensioning of the diaphragm is also necessary in order that its resonant frequency will occur high enough in the frequency scale to avoid resonance peaks in the working range. In view of all these facts it will be evident that the object of the invention can be attained only by a novel structure.

According to one important feature of the invention, a very small transmitter is made possible by tensioning the diaphragm by external means which form no part of the completed instrument, and using a clamping ring on the instrument of only sufficient size to maintain the necessary tension. This in itself not only practically eliminates the cavity resonance but also materially reduces the necessary size of the device.

Another important feature of the invention is the proportioning of the back electrode to give maximum generated voltage with minimum inactive capacity. The novel arrangement and proportioning of the electrodes according to the invention together with the prestretched diaphragm feature, provides a construction which is capable of covering a wider frequency range at a higher efficiency as compared with present structures. Alternatively, a transmitter designed in accordance with the invention to cover only the range now commonly used may be made considerably more efficient than present devices.

By suitably combining these features as will be more fully explained, it has been found practical to reduce the diameter of these transmitters to considerably less than one-third of those now commonly used and at the same time to reduce the cost very materially.

The several features of the invention will be better understood from a study of the following detailed description of a specific structure made in accordance with the principles discussed above and the drawings in which Fig. 1 is an enlarged sectional view of a transmitter according to the invention;

Fig. 2 is an assembly of such a transmitter and its associated amplifier;

Fig. 3 is an exploded view of the transmitter of Fig. 1; and

Fig. 4 is a series of response curves illustrating the improved results obtainable according to the invention.

Referring now to Fig. 2, the transmitter 1 is attached by a threaded connection to the tube 2 which at its other end leads into the vacuum tube amplifier 3. The function of the tube is to separate the comparatively large bulk of the amplifier from the transmitter so as to avoid disturbance to the sound field. From the foregoing discussion it will be evident that the tube should not be substantially larger in diameter than the transmitter and that its length will necessarily depend upon the relative size of the transmitter and the amplifier. It is found, for instance, that with a transmitter of about 1 inch diameter and an amplifier of 3 inch diameter, a tube of 6 inches to 8 inches in length is satisfactory. Since it is desirable to keep the capacity between the leads from the transmitter to the amplifier a minimum, the tube may be used as one lead and the other may consist of a wire 16 suitably held in the center of the tube by insulating spacers 17 as indicated.

The detailed construction of the transmitter is shown more clearly in Fig. 1 in which the metal casing 4 carries an internal steel ring 5 which forms a seat for the back electrode structure 6. This structure consists of a steel electrode or plate 7 and a steel member 8 secured by screw 20 on opposite sides of an insulator 9 which supports the electrode on the ring 5. The diaphragm 10 is secured between the steel clamping ring 11 and the surface 12 of the casing 4 to give the proper spacing of 1 mil between the diaphragm and the face 18 of the electrode 7. One convenient way of making this adjustment accurately is to assemble the device leaving out the washer 19 which is of thickness equal to the desired electrode spacing, lap the surfaces 12 and 18 until they are in exactly the same plane and then insert the washer 19 when finally assembling the instrument. Dowel pins 21 and 22 are provided to hold the several parts of the assembly in their proper relation and a slot 23 is cut in the insulator 9 to provide an air leakage path so that the air pressures on the opposite sides of the diaphragm will not become unequal due to temperature changes. The paper washers 35 and 36 are used in the assembly to distribute the pressures uniformly over the surface of insulator 9.

A sheet of diaphragm material which is preferably duralumin of 1 mil thickness is tensioned in a suitable frame (not shown) and the clamping ring 11 is secured in place before the diaphragm 10 is cut out of the sheet so that, as previously pointed out, the ring need be only of sufficient size to maintain the tension. The insulator 9 is preferably of Pyrex glass or other suitable dielectric material which will not warp and thereby destroy the accuracy of the electrode spacing. The electrode 7 has a circular face 18 adjacent to the diaphragm but is cut away at the back so as to leave a spider-like construction of arms 13 radiating from the center. In this manner it is made very stable in its mounting and, due to the relatively small area of the electrode presented to the casing and the relatively large air space surrounding the arms the inactive capacity between the electrode and the casing is very small as compared with the active capacity between the electrode and the diaphragm. In accordance with well known principles as set forth in Patents 1,333,744 and 1,722,347 to Wente and Patent 1,456,538 to Crandall, the necessary damping is obtained by the displacement of the air between the diaphragm and the back electrode but excessive damping at high frequencies is prevented by grooving and perforations in the face of the electrode. In this case, however, this construction has been simplified by the use of a single circular groove 14 with openings 15 in the relatively thin portions of the electrode between the arms 13.

It is well understood in the art that the effective response of a condenser transmitter depends not only upon the design of the transmitter itself but also on the characteristics of the amplifier with which it is to be used. The ideal arrangement would be to have an amplifier of infinite input impedance, but since there are design factors which limit the maximum obtainable amplifier impedance the useful response is necessarily slightly less than the generated voltage would indicate. It has been found advisable in the design of these transmitters to disregard this fact to proportion the parts for maximum generated voltage and to use an amplifier of the highest input impedance obtainable rather than to base the design on the assumption that an amplifier of any given impedance will be used.

For maximum generated voltage in any condenser transmitter it has been found that there is a definite relation between the optimum electrode sizes and certain other design factors. This may be expressed by saying that the ratio of the radius of the back electrode, $a$, to the radius of the free portion of the diaphragm, $R$, should be as follows:

$$\frac{a}{R} = \sqrt{\frac{2\sqrt{1+m}-1}{m}} \quad (1)$$

where $m$ is equal to the free radius of the diaphragm in centimeters squared, divided by the product of twice the spacing of the electrodes in centimeters and the inactive capacity of the instrument in absolute electrostatic units.

A study of the series of curves shown on Fig. 4 gives a better understanding of the general statements in the first part of the specification and of the improved results attained in accordance with the invention. These curves are plotted with a common logarithmic frequency scale as abscissa, with separate ordinate scales (in decibels in accordance with the usual practice in calibrating devices of this kind). The zero level in each case is the same and represents an arbitrary value chosen for purposes of comparing the various curves.

Curve 25 is the thermophone calibration curve of a typical instrument of the prior art and indicates that the response is uniform for all practical purposes up to about 7000 cycles since variations of 3 db. or less are scarcely detected by the average ear. Curves 26 and 27 show the cavity resonance and pressure doubling effects already discussed which alter the response of the instrument as commonly used. The actual results obtained when the transmitter is facing the sound source in open air (or in a comparatively "dead" or heavily damped room) are therefore more nearly indicated by curve 28 which is the sum of curves 25, 26 and 27. However, if the transmitter is located at 90° to the sound source or is used in a "live" room where a very large percentage of the energy approaches the instrument in the plane of the diaphragm, even curve 28 is by no means an accurate indication of the actual response obtained.

In the 90° position the instrument, which is usually comparatively thin transversely to the plane of the diaphragm, is a small obstacle for sound waves over the part of the important frequency range so that the transition effect occurs so much higher in the scale that it may not materially alter the response over the range for which it is commonly used. The cavity resonance ordinarily would be unchanged but there would be a loss at high frequencies due to phase differences in the waves for various parts of the diaphragm as shown by curve 29. Hence, for this extreme condition the response is indicated by the thermophone calibration plus the cavity resonance, minus the phase loss as shown by curve 30. It is evident that the results obtained under the conditions of either of the curves 28 or 30 are very different from those indicated by the thermophone calibration of curve 25. For instance, the latter calibration indicates that the response does not reach the arbitrarily chosen zero level until about 9000 cycles is reached, whereas under the conditions of curve 30 the zero level is actually reached at 6000 cycles. While it is true that the curves 28 and 30 represent extreme conditions and that for some applications the actual response is somewhat more uniform than these curves would indicate, it will be apparent from the foregoing explanation that the response of these devices of the prior art differs widely with the conditions under which they are used. Consequently, a certain amount of frequency distortion in the upper range is unavoidable with these devices and, as indicated by the curves, the very high frequencies are deficient or entirely absent in the output of such instruments.

The characteristics of two types of transmitters made in accordance with the present invention are designated 31 and 32. These devices are of essentially the same construction except that the former uses a diaphragm tensioned to about 16,000 lbs. per square inch whereas in the latter the tension is about 40,000 lbs. per square inch. As is well understood in the art, this results in a higher efficiency for the former but the range of the device is accordingly less than can be obtained at a somewhat lower efficiency with the greater tension. As already stated the cavity resonances in these new devices are entirely negligible and are therefore not considered. Curves 33 and 34 show the pressure doubling and phase loss effects respectively from which the broken line curves indicating the variations from the thermophone calibration are plotted for the curves 31 and 32 in accordance with the legend on the drawings. From a comparison of the thermophone curves 31 and 32 with the curve 25 the material improvement in frequency range attained is very apparent and it will be noted that this is accomplished at increased efficiency with the first instrument and by only a slight sacrifice in the efficiency at the upper end when the working range is extended to 16,000 cycles which is the upper limit of audibility. While no curve has been shown for these devices used in a live room, such as a modern studio, since the curves will vary with the nature of the room used, it will be remembered that the pressure doubling effect is negligible for waves transverse to the plane of the diaphragm and since the energy actuating a transmitter in a live room is very largely of the nature of reflected waves there is ordinarily only a small increase in response at high frequency from this cause. This increase is nullified, however, by the phase loss which in a very live room may be as great as indicated by curve 34. Hence it will be seen that for live room use the response will be substantially flat up to 10,000 cycles with a slight decrease above that range due to the increasing phase loss.

Present high quality systems are intended effectively to translate frequencies up to 5,000 or 6,000 cycles but from the foregoing explanation of the curves of Fig. 4 it will be seen that reasonable uniformity of response near the upper end of this range can be obtained with present devices only by using them under conditions which minimize the irregularities due to the various effects discussed. If, in applying the principles of the present invention to any particular case, this range is considered sufficient, it is of course unnecessary to make the device as small as possible. With the improved clamping arrangement of the invention instruments having electrodes of the same size as the prior art devices (which are ordinarily of about 3 inch outside diameter) may be made of 2 inch diameter or less and it is found that even this reduction in size gives a very decided improvement in the upper portion of the characteristic.

The instruments used for illustration, however, have an outside diameter of about .9 inch with a free diaphragm diameter of about .7 inch. It should be understood, however, that if the relation of the Equation (1) is maintained and proper attention given to the mechanical difficulties involved in manufacturing, still smaller instruments may be made which will give even better results than those indicated by the curves 31 and 32.

The invention therefore is not intended to be limited to instruments of any particular size or characteristic except as defined in the following claims.

What is claimed is:

1. In combination, a vibration translating device small enough to be placed in a sound field without substantially distorting it for important sound frequencies, an amplifier and rigid means of substantially the same diameter as the device holding the device and the amplifier in spaced relation and constituting an electrical connection between them.

2. In combination, a vibration translating device small enough to be placed in a sound field without substantially distorting it for important sound frequencies, an amplifier, rigid means comprising a metallic tube of substantially the diameter of the device forming both a mechanical and an electrical connection between the amplifier and the device and a conductor mounted within the tube completing the electrical connection.

3. In combination, a vibration translating device not exceeding one inch in diameter comprising a stretched diaphragm and a plate in close face-to-face spaced relation, a housing supporting the diaphragm, the plate and clamping means for maintaining the tension of the diaphragm, an amplifier and rigid means having a diameter substantially equal to that of the device forming a mechanical and an electrical connection between the device and the amplifier.

4. In combination, a vibration translating device of the order of one inch in diameter, comprising a back electrode and a highly tensioned diaphragm in close spaced relation, and a tubular member of substantially the same diameter as the device supporting the device and constituting an electrical connection to the diaphragm.

5. In a vibration translating device of the order of one inch in diameter, the combination with a housing, a highly tensioned diaphragm and a back electrode supported by the housing in close spaced relation, of clamping means of sufficient bulk to maintain the tension of the diaphragm, but of such small dimensions that it is incapable of tensioning the diaphragm.

6. A vibration translating device of the order of one inch in diameter, comprising a housing, a back electrode supported by the housing, a highly tensioned diaphragm over one end of the housing, and clamping means adapted solely for maintaining the tension of the diaphragm secured to the housing through the diaphragm and being of such small bulk and configuration as to be incapable of producing the tension.

PAUL B. FLANDERS.
HENRY C. HARRISON.